Patented May 7, 1946

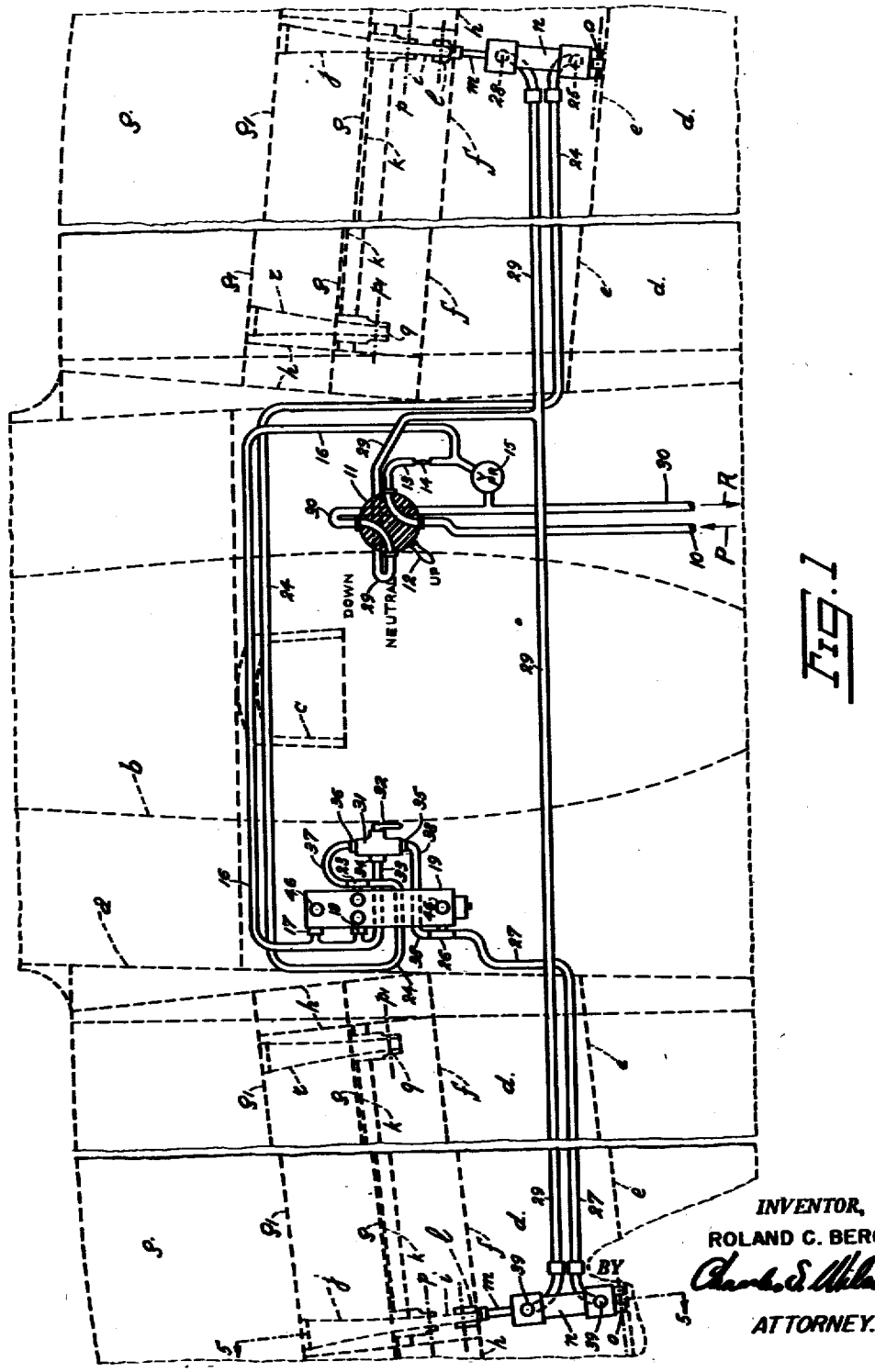

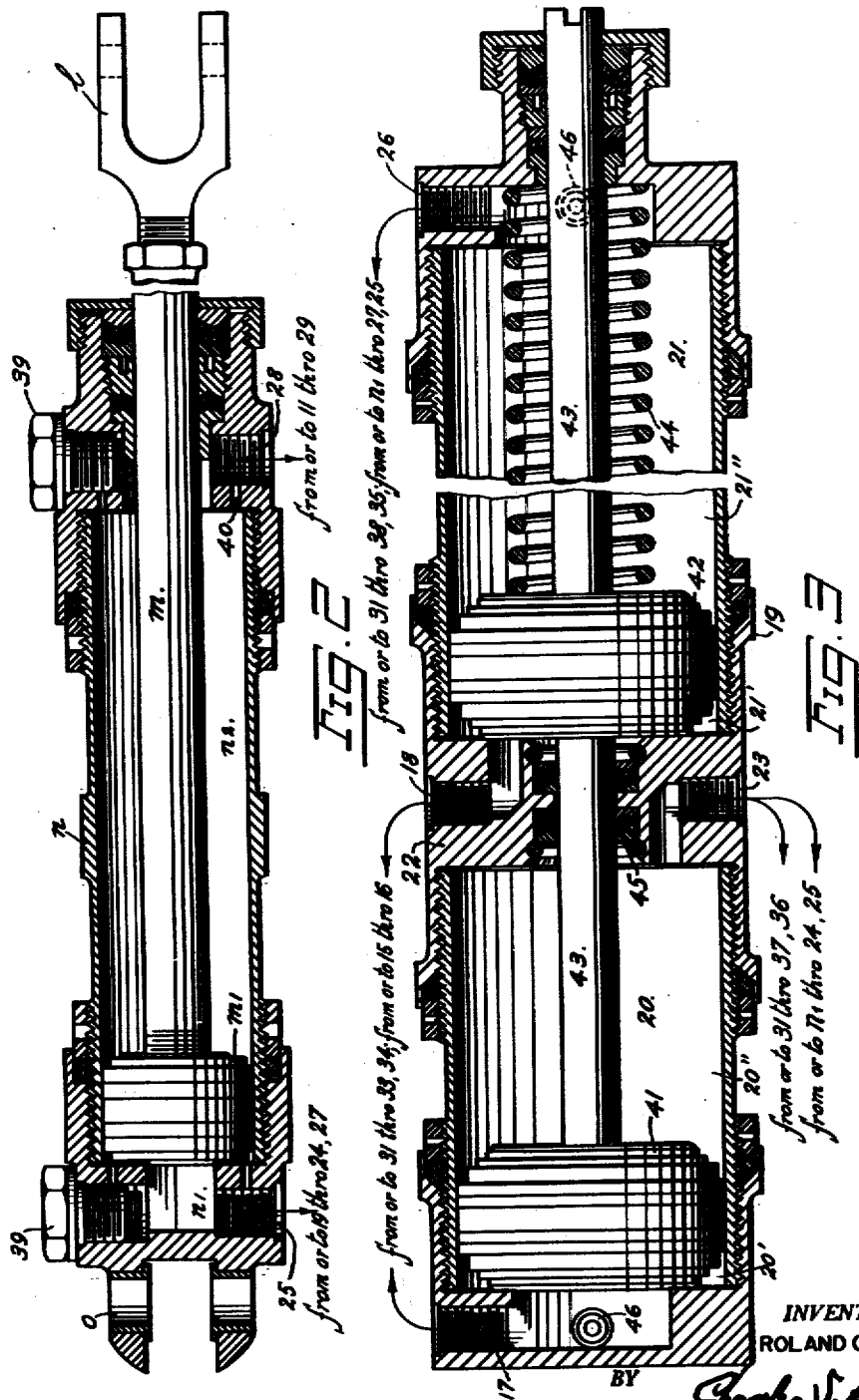

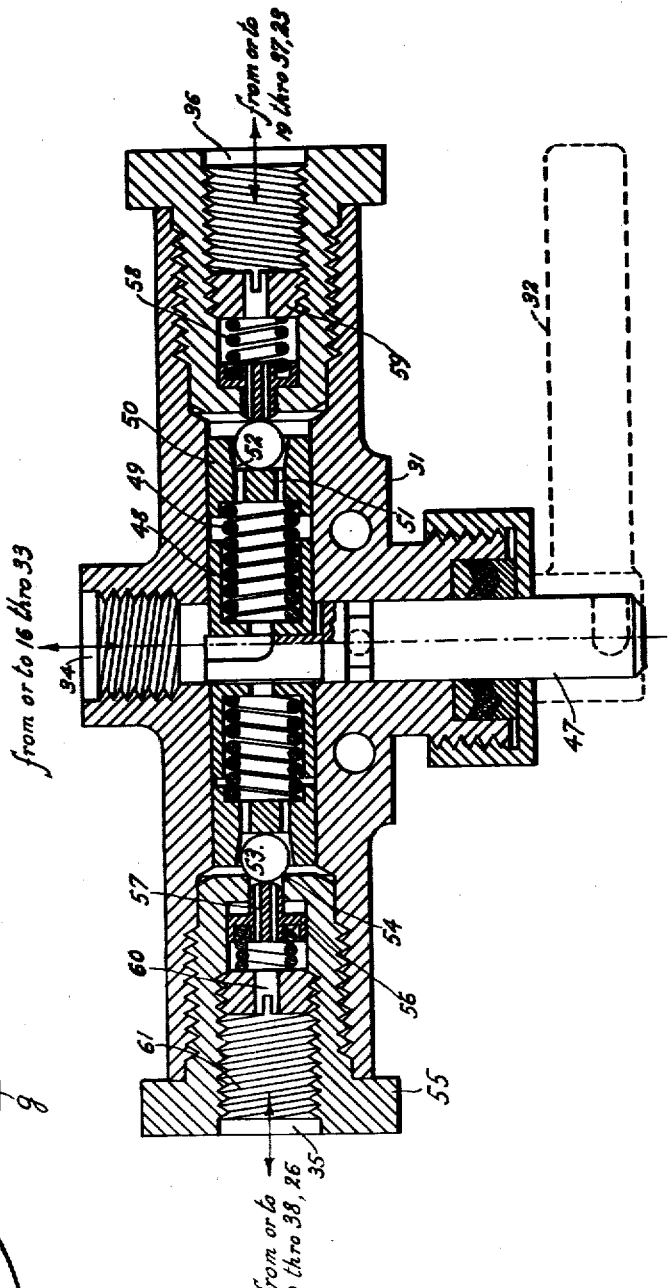
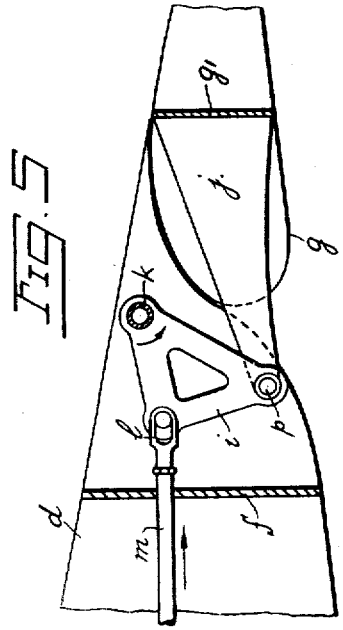
INVENTOR,
ROLAND C. BERGH
ATTORNEY.

2,399,719

UNITED STATES PATENT OFFICE 2,399,719

AIRCRAFT STRUCTURE

Roland Christian Bergh, Cedarhurst, N. Y., assignor to Republic Aviation Corporation, a corporation of Delaware Application November 26, 1942, Serial No. 467,011

16 Claims. (Cl. 60—54.5)

This invention relates to aircraft structure and particularly to certain dual, movable components thereof—among which components are included ailerons, elevators and, more especially wing-flaps, or lift-and-drag changers.

The invention is concerned primarily with the operation of such flaps, but, as will be made manifest, is not limited in its scope to flaps alone and can be adapted to any pair of movable components on the aircraft that are susceptible of operation by fluid-pressure means.

In operating flaps, it is of primary importance, to prevent accidents, that the two flaps be moved in substantial unison, especially in lowering them, but during flight, the air loading on one flap often varies from that on the other flap, so that this condition, among others, has heretofore rendered unified operation of the flaps most difficult to achieve.

It has been proposed, with this operation in mind, to effectuate synchronization of certain aircraft components by mechanical, linkage-systems and by employing rigid braces or torque-tems interconnecting the flaps structurally through the fuselage, but, due to certain factors, including the prohibitive weight of such linkage-systems as were sufficiently strong, these proposed mechanical or structural synchronizers have not been an unqualified success.

It has also been proposed to synchronize the operation of dual aircraft components by means of an automatic throttle-valve, provided to equalize the rate of flow of the pressure fluid from the fluid main through the two branches controlling the operation of the components, but, though satisfactory enough for operating a certain type of dual-component, the system of this proposal is not reliable enough to operate the wing-flaps dealt with by the present invention, and cannot insure synchronized movement of the flaps, due to variations in internal pressure and, especially, because of the varying air loadings on the respective flaps.

It is the general object of this invention to provide a system for operating wing-flaps which will move the dual-surfaces in absolute unison despite variations in internal fluid-pressure and despite variations or discrepancies in air-loading on the respective flaps.

It is a particular object of the invention to provide a flap-operating system which will automatically equalize—and thus obviate—the effect of the discrepancies in air loads on the respective flaps, before this discrepancy reaches such an amount as to render the flap-system ineffective or inoperative.

A more particular object is to provide an hydraulic system for equalizing this discrepancy in the air loads by means which will be independent of both the hydraulic pressure and the hydraulic velocity, of the system.

The other objects of the invention will be made manifest as this disclosure proceeds.

The presently-preferred embodiment of these, and other, inventive concepts will now be described in conjunction with the accompanying drawings, but it is to be understood that the invention is limited in its embodiments only by the scope of the sub-joined claims. In these drawings, Figure 1 is a fragmentary plan view of the system of this invention, showing in dotted lines certain parts of an aircraft associated with the system of the present invention;

Figure 2 is an axial section of one of the flap operating cylinders, shown in Figure 1;

Figure 3 is an axial section of the equalizing cylinder, shown in Figure 1;

Figure 4 is an axial section of the temperature, replenishing and emergency valve, shown associated with the equalizing cylinder in Figure 1, and Figure 5 is a section along line 5—5 of Figure 1, showing the mechanical connection between a flap operating cylinder and the corresponding flap.

In Figure 1, the hydraulic system of this invention is mounted principally in a fuselage, $a$, covered by a canopy, $b$, supporting a pilot's seat, $c$, and carrying two wing-halves $d$. Each wing-half is provided with spars, $e$ and $f$, and at the trailing edge of the wing, each wing-half has an airfoil-section type of flap, $g$ of the N. A. C. A. slotted-trailing-edge species, each including a flap spar, $g1$. Each flap is carried by three hinge system, $h$, of the trapezoidal-linkage type, and supported on the inboard end of spar $f$ and each is operated by means of a double-acting hydraulic motor $n$, pivoted as at $o$ to the number two wing spar $e$. A triangular operating lever $i$ (see Figure 5) is linked to the forked end $l$ of a piston rod, $m$, and a piston $m1$, working in the cylinder $n$ is pivoted as at $p$ to a mast $j$ anchored to the flap spar $g1$. The third point of this operating lever $i$ is fixedly mounted on a torque tube $k$ extending from a point proximate the inboard end of the flap to the intermediate hinge linkage $h$. A reinforcing lever $q$, likewise pivoted as at $p1$ to an inner mast $r$, is also secured on each torque tube k to transmit the motion imparted by the operating lever 1 to the inner end of the flap g and to protect the hinges h against torsional and shear stresses.

A fluid, preferably an oil, under pressure, is contained in the system, and the pressure is derived from a suitable engine pump (not shown) or a hand pump. The fluid is led from the source of fluid-under-pressure through a pressure or supply line 10 into a suitable four-way selector valve, 11. This valve is adapted to selectively connect the pressure line 10 with either of the two conduits 13, 29 and the other of said conduits 13—29 to a return line 30, by means of the selector-handle 12 and thus to adjust the position of the twin flaps g, g, operating in unison, in either the "up," "neutral" or "down" positions.

The selector valve 11 can be manipulated to connect the supply or pressure line 10 to either the conduit 13—16, in which event it simultaneously connects the conduit 29 to the return line 30, or to the conduit 29 in which event it simultaneously connects the conduit 13—16 to the return line 30. The first of these adjustments is for the lowering of the flaps while the second is for the raising thereof. When the valve 11 is adjusted to a neutral position all of the connections aforesaid are broken thereby trapping all fluid then in the conduits and locking the flaps in the positions they then occupy.

In the conduits 13—16 is inserted a conventional or standard restrictor unit 14 to regulate and control the rate of flow of the fluid therethrough. A conventional or standard relief valve 15 is connected with this conduit 13—16 and with the return line 30 for reducing the pressure in the conduit 13—16 to a predetermined maximum and returning the excess fluid to the line 30. The conduit 13—16 leads to the inlet ports 17 and 18 of the equalizer 19 and supplies operating fluid under pressure thereto.

The equalizer 19, as shown in Figure 3, consists essentially of a cylinder divided, by means of a partition-member, 22, into separate, unconnected chambers 20 and 21. A piston-rod, 43, passes through chamber 21 into chamber 20, and in chamber 21 carries a piston 42, while in chamber 20, it carries a piston 41. The chamber 21, while of the same diameter as that of chamber 20, is constructed of greater length than chamber 20, and accommodates a helical spring 44 coiled around the piston rod therein. The compressive force of this spring acts constantly to tend to urge the pistons 41 and 42 in the positions shown in Figure 3; that is, to the extreme limit of the stroke. A packing-group 45, is provided in the partition 22 around the piston rod and prevents passage of the oil between the chambers. A bleeder 46 is provided in each of the chambers to allow undesired air to escape on occasion. Thus, fluid supplied under pressure to the equalizer by way of ports 17 and 18 cannot, in these positions of the piston-heads, enter farther into the cylinder than the respective extreme faces of the piston-heads, as at 20' and 21'.

The other side, 20", of the piston-head 41 is connected by an outlet port 23 and a feed conduit 24, to the inlet port 25 of the port-side flap operating cylinder n. The operating-side 21" of the piston 42 is operatively connected by a port 26 and a feed-line 27 to the inlet port 25 of the starboard-side flap operating cylinder, n.

There is thus established, two fluid-systems: one comprising the volume 20" on the partition-side of the piston 41, the outlet port 23, the feed-conduit 24 and the inlet port 25 of the port-side flap-operating cylinder; and the other comprising the volume 21", outlet port 26, conduit 27 and the inlet port 25 of the starboard-side flap operating cylinder. Each of these fluid-circuits forms, with the volume n1, of each flap operating cylinder n, a closed fluid-system in which a predetermined and fixed amount and volume of fluid is contained and trapped. Thus, when the pistons 41 and 42 are simultaneously moved, toward the right in Figure 3, against the action of spring 44 by the fluid pressure built-up against the working-sides 20' and 21', they cause the expulsion of an exactly equal amount of fluid from against the working sides 20" and 21". This expelled fluid is forced separately in two streams through the members 23, 24, 25; and 26, 27, 25, into the working-side n1 of each of the cylinders n, thereby causing the hydraulic jacks n and associated flap-operating mechanism to deflect the pivoted flaps downwardly, simultaneously.

Conduit 29—a pressure line—leads directly, at each of its two ends, into an inlet port 28 in the opposite end of cylinders n, and when the handle 12 of the selector is brought into its "up" position, the flaps g are then raised into their "up" position.

The selector 11 and the relief valve 15 are connected by a return-line 30 to the source of fluid, or reservoir (not shown).

Each flap-operating cylinder is provided with suitable bleeders 39 at each end thereof, opposite ports 25 and 28. Removal of air from each of the working sides n1 and n2 of the cylinders is facilitated by air vents 40.

A triple-function valve-group 31 is provided to cooperate, as shown in Figure 1, with the equalizer 19 and the rest of the system and, for one function, maintains a constant volume of fluid in the closed-system 20",23,24,25, n1, (port-side flap cylinder) and also in the closed-system 21", 26, 27, 25 and n1 (starboard-side flap cylinder). This valve is controlled and actuated by means of a lever 32, and is connected, on one side, to feed line 16 through a central port 34 and a replenishing-conduit 33. On the other working-side, it is connected through end ports 35 and 36 and conduits 37 and 38, with ports 23 and 26 affording ingress into the right-hand working-spaces 20" and 21" of, respectively, chambers 20 and 21; that is to say, it is thus connected with the two aforementioned closed-circuits. Lever 32 is mounted upon a camshaft 47, bearing cams adapted to bear simultaneously upon two opposed plungers 48 mounted co-axially of the valve body and to move them, when lever 32 is moved from neutral, from the normal closed position (as shown by the position of the valve on the left side of Figure 4), into the open position (as shown on the right side), against the action of springs 49. The springs 49 bear against sleeves 50 which are provided with longitudinal fluid-passages 51 and channelled, spherical seats 52. Seats 52 embrace spherical balls 53, which cooperate with valve seats 54 formed in the internal ends of valve plugs 55. Each plug 55 contains a plunger 56 slidably mounted therein. Each plunger 56 is provided with longitudinally-extending fluid-passages 57, and the plunger is normally pressed against its corresponding ball by means of a spring 58. The load exerted by springs 58 may be varied to suit varying conditions by means of nuts 59, each provided with a central screw-driver slot 60, and threadedly engaged with internal threads 61 in the plugs 55.

In service, the control lever 12 is, normally, left in its "up" position, and the flaps are then maintained, when thus not in use, firmly held retracted by the hydraulic system pressure, securely and airtightly nested against the "flap cut-out" of the wing, in the position shown in Figure 5. Thus, the tendency of retracted flaps to "flutter" and eventually cause structural failure of the airplane at ultra-high speeds, is obviated.

In this retracted position, feed line 10 is in communication with both branches of the flap-raising conduit 29 and conduit 13 merely discharges to the return-line, 30. Thus, both pistons m1 of the flap-cylinders are then at their extreme left-hand positions, as shown in Figure 2, the pistons 41 and 42 of the equalizing member being then also in their extreme left-hand positions, as in Figure 3. The other main-hand member of the system—the triple-function valve—group 31—then has both its valve-members in their closed position, instead of but the one shown closed in Figure 4.

In order to deflect and lower the flaps in perfect synchronism by means of the present invention, the pilot merely moves the lever 12 from this "up" position into the "down" position, which has the effect of reversing these communications. Fluid directly from the pressure source, under an ultra-high pressure—for example, 1000 lbs. per sq. in.—then passes from selector 11 through conduit 13, restrictor 14 and conduit 16. The relief valve 15 being connected to the conduit 16, as well as to the return line 30 and being set to a predetermined maximum pressure of, for example, 500 lbs. per sq. in. will remove all fluid from the conduit 16 resulting in a pressure in excess of said predetermined maximum and will deliver it to the return 30. With its pressure thus reduced the fluid is then admitted, via conduit 16 and inlet ports 17 and 18, simultaneously, into the pressure-sides 20' and 21' of the equalizer-member, and through conduit 33 into valve-group 31, but cannot enter therein farther than valve-seats 54 thereof, since the ball-valves 53 are now seated, by means of springs 49, compressed by the position of the cams on the lever 47.

Thus, the connected pistons 41 and 42 are now forcibly displaced toward the right—referring to Figure 3—against the resistance of the spring 44 and against the reaction of the dynamic air—the airplane being postulated as in flight—flowing around the airplane wings and opposing any motion of the flaps, this latter resistance being considerably greater than the former. This movement to the right of the pistons 41 and 42 is transmitted through the substantially incompressible fluid in the two closed, equal-volume fluid systems: 20'', 23, 24, 25, n1 (for the port-side flap) and 21'', 26, 27, 25, n1 (for the starboard-side flap), to the respective pistons m1, of the operating cylinders n. These pistons are thereby urged to the right (referring to Figure 2), and thereby, via the linkage system, l, i, p, j, etc., of Figure 5, deflect both flaps. Since the volume of incompressible fluid is equal in both closed circuits and since it does not depend upon fluid pressure and velocity, both flaps are simultaneously lowered, regardless of fluid-pressure or velocity variations anywhere else in the hydraulic system and regardless of differing air loads on the respective flaps, thus achieving absolute synchronism in lowering the flaps.

At the same time, fluid under this reduced pressure of, say, 500 lbs. per sq. in., is simultaneously passing from ports 23 and 26 of the equalizing-structure through conduits 37 and 38 simultaneously into ports 35 and 36 of the triple-function valve-group, 31. The fluid pressure on both sides thereof, at the valves 53 and 54—then maintained closed by springs 49 urged by the cams on shaft 47—will be equal and the valve-group 31 is then inactive.

If the pilot does not desire to lower the flaps to their fully-deflected position, which position is used for a landing, but instead wishes to deflect them to some intermediate position, which is the position used for take-off or to clear an obstacle, the lever 12 can be thrown into the "neutral" position just before the pistons m1 have reached extreme stroke. The pistons m1—holding the flaps—are then positively, directly and securely maintained in this position by the direct-action of the equal-volumes of fluid trapped in closed-systems 20'', 23, 24, 25, n1 and 21'', 26, 27, 25, n1. They will also be indirectly held in the desired position by the 500 lb. per sq. in. fluid pressure now trapped in conduit 16 between relief valve 15 and the left-side of pistons 41 and 42. The dynamic air load acting on the flaps also is then acting to hold these flaps in this position. The angle at which the flaps remain deflected in this intermediate position will be maintained constant if the air loading remains at or below, the maximum pressure determined by the relief valve 15, but if the sum of the air load plus the spring load, 44, becomes greater than said maximum pressure, the angle of the flaps will change and decrease until the sum of the air load plus the spring load again equals said maximum pressure.

If, however, the pilot leaves the lever 12 in the "down" position sufficiently long, the pistons m1 will travel to their extreme right-hand positions (referring to Figure 2) and the flaps will deflect to their maximum lowered position. Since volume 20 is chosen greater than volume n2, the piston 41 will not yet have stroked completely to the right (referring to Figure 3), nor, of course, will have piston 42, since volume 21 is chosen considerably larger than volume 20. Thus, the pistons m1, cooperating with the right-hand working heads of the cylinders n, will then act as positive, direct-engaging mechanical stops to limit and determine the deflection of the flaps.

The flaps being in this extreme deflected position, if the pilot throws lever 12 into "neutral," the flaps are not moved as long as the sum of the air load plus the spring load, 44, is less than, or equal to, the chosen maximum pressure, say 500 lb. per sq. in. However, if the sum of the air load plus the spring load exceeds this 500 lbs. figure, the flaps automatically begin to move upwardly toward retracted position and establish equilibrium between the fluid pressure and the air load, thus equalizing any discrepancy that may exist between respective flap-loadings from dynamic air.

With the flaps in fully deflected position, to manually control the retraction of the flaps, the pilot throws the lever 12 into its "up" position, and thereby re-interconnects conduit 13 with the return-line 30 and re-interconnecting feed-line 10 with conduit 29. Fluid under the initial pressure—say, 1,000 lbs. per sq. in.—then flows through conduit 29 and enters the flap-retracting port 28 of each flap-cylinder n. The pressure of the ensuing leftward motion of each piston m1 is then transmitted back to the joined-pistons 41 and 42, through the fluid trapped in closed-circuits n1, 25, 24, 23, 20'' and n1, 25, 27, 26, 21'', forcing the pistons back into the position shown in Figure 3. The fluid thereby expelled from the working-sides 20' and 21' simultaneously through the ports 17 and 18, then returns to the fluid-reservoir through the system 10, 15, 14, 13, 11 and 30.

When the fluid-pressure, either at the pressure-source (pump) or in either one or both of the closed, equal-volume circuits, rises above certain limits, and thereby creates heat-energy and excessive temperature rise, the springs 49, set at a predetermined limit (for example, 1500 lbs. per sq. in.), yield and allow one or both valves 52 to open, thus allowing the fluid to escape elsewhere into the system and the pressure to drop, thereby dissipating the excess heat-energy.

If a leak should occur in one or both of the equal-volume closed circuits, the valve-group 31 funtions, when the lever 32 is momentarily turned 90°, to allow a suitable portion of the fluid from the source to enter the valve-member at port 34 and thence pass through either or both of the valves 52, 53 into either or both of the equal-volume closed-circuits that operate the flaps, to thereby make up for the loss of fluid therein and maintain the equal volumes constant in amount. Though this replenishing function of the valve-group 31 is manually controlled, the functioning of the valve-group as a temperature controlling device occurs automatically.

If it should occur that the equalizing-group should malfunction or become inoperative—as by damage from extraneous influences such as hits from projectiles, bad landings causing structural failure, etc.—the hand lever 32 is operated to maintain the valve group 31 in its completely "open" position, to thereby by-pass group 19 and cut it out of the system. Fluid from the circuit 13, 14, 15, 16, 17 and 18 then flows directly into the two ports 25 through the circuit 33, 31, 35, 38, 26, 27 and through the circuit 33, 31, 36, 37, 23, and 24, to lower the flaps, though not, of course, in the perfect synchronism that would obtain were the equalizing group 19, operating in the system.

Having thus disclosed the invention and the presently-preferred embodiment thereof, what is claimed is:

1. An hydraulic system for the synchronous operation of dual aircraft components comprising; the combination with a motor for each of said components including a cylinder having an inlet and an outlet port and a piston in said cylinder connected to the coacting aircraft component, of an equalizer consisting of a cylinder enclosing individual chambers, each chamber having an outlet port and an inlet port, a piston in each chamber, and a connection between said pistons whereby they operate in their respective chambers in unison, a tube establishing communication between the outlet port of each chamber of the equalizer and the inlet port of the motor of one of the aircraft components, a common tube connecting with the outlet ports of the motors, a common inlet tube for the equalizer communicating with the inlet ports of the respective chambers thereof, a source of fluid under pressure, a supply tube from said source, a return tube leading to said source, and a selector valve adjustable to simultaneously connect the supply tube with the common inlet tube of the equalizer and the return tube with the common tube connecting with the outlet ports of the motor cylinders, or, in the alternative, to simultaneously connect the common inlet tube of the equalizer with the return tube and the supply tube with the common tube leading to the outlet ports of the motor cylinders.

2. An hydraulic system for the synchronous operation of dual aircraft components comprising; the combination with a motor for each of said components including a cylinder having an inlet and an outlet port and a piston in said cylinder connected to the coacting aircraft component, of an equalizer consisting of a cylinder enclosing individual chambers, each chamber having an outlet port and an inlet port, a piston in each chamber, and a connection between said pistons whereby they operate in their respective chambers in unison, a tube establishing communication between the outlet port of each chamber of the equalizer and the inlet port of the motor of one of the aircraft components, a common tube connecting with the outlet ports of the motors, a common inlet tube for the equalizer communicating with the inlet ports of the respective chambers thereof, a source of fluid under pressure, a supply tube from said source, a return tube leading to said source, a selector valve adjustable to simultaneously connect the supply tube with the common inlet tube of the equalizer and the return tube with the common tube connecting with the outlet ports of the motor cylinders, or, in the alternative, to simultaneously connect the common inlet tube of the equalizer with the return tube and the supply tube with the common tube leading to the outlet ports of the motor cylinders, and a valve group associated with said equalizer and connected to the outlet ports of the chambers of the equalizer and to the inlet ports of the motors and in permanent communication with the common inlet tube of the equalizer.

3. An hydraulic system for the synchronous operation of dual aircraft components comprising; the combination with a motor for each of said components including a cylinder having an inlet and an outlet port, and a piston in said cylinder connected to the coacting aircraft component, of an equalizer consisting of a cylinder enclosing individual chambers, each chamber having an outlet port and an inlet port, a piston in each chamber, and a connection between said pistons whereby they operate in their respective chambers in unison, a tube establishing communication between the outlet port of each chamber of the equalizer and the inlet port of the motor of one of the aircraft components, a common tube connecting with the outlet ports of the motors, a common inlet tube for the equalizer communicating with the inlet ports of the respective chambers thereof, a source of fluid under pressure, a supply tube from said source, a return tube leading to said source, a selector valve adjustable to simultaneously connect the supply tube with the common inlet tube of the equalizer and the return tube with the common tube connecting with the outlet ports of the motor cylinders, or, in the alternative, to simultaneously connect the common inlet tube of the equalizer with the return tube and the supply tube with the common tube leading to the outlet ports of the motor cylinders, and a valve group associated with said equalizer and connected to the outlet ports of the chambers of the equalizer and to the inlet ports of the motors and in permanent communication with the common inlet tube of the equalizer, said valve assembly being normally closed but permitting the flow of fluid from the motor cylinders at all times and when open by-passing the equalizer aforesaid.

4. An hydraulic system for the synchronous operation of dual aircraft components comprising; the combination with a motor for each of said components including a cylinder having an inlet and an outlet port, and a piston in said cylinder connected to the coacting aircraft component, of an equalizer consisting of a cylinder enclosing individual chambers, each chamber having an outlet port and an inlet port, a piston in each chamber, and a connection between said pistons whereby they operate in their respective chambers in unison, a tube establishing communication between the outlet port of each chamber of the equalizer and the inlet port of the motor of one of the aircraft components, a common tube connecting with the outlet ports of the motors, a common inlet tube for the equalizer communicating with the inlet ports of the respective chambers thereof, a source of fluid pressure, a supply tube from said source, a return tube leading to said source, a selector valve adjustable to simultaneously connect the supply tube with the common inlet tube of the equalizer and the return tube with the common tube connecting with the outlet ports of the motor cylinders, or, in the alternative, to simultaneously connect the common inlet tube of the equalizer with the return tube and the supply tube with the common tube leading to the outlet ports of the motor cylinders, and a normally closed valve group associated with the equalizer and connected to the outlet ports of the chambers of the equalizer and the inlet ports of the motors and permanent communication with the common inlet tube of the equalizer, said valve group including means permitting the relief of fluid pressure in the tubes between the outlets of the equalizer and the inlets of the motors.

5. An hydraulic system for the synchronous operation of dual aircraft components comprising; the combination with an hydraulic motor, including an inlet and an outlet port, individual to and operatively connected with each component, of an equalizer having an independent chamber and piston individual to each motor, each chamber being provided with an inlet and an outlet port, the outlet ports of the equalizer chambers being directly connected to the inlet ports of the motors and the pistons of said chambers being connected together to operate in unison, a source of fluid under pressure connectible with the inlet ports of the equalizer, a return to said source of fluid under pressure connectible with either the inlet ports of the equalizer or the outlet ports of the motors, a relief valve between the source of fluid under pressure and said return, and a valve group having opposed ports each connected to the inlet port of one of the motors and having a medial port connected with the inlet ports of said equalizing chambers.

6. An hydraulic system for the synchronous operation of dual aircraft components comprising; the combination with an hydraulic motor, including an inlet and an outlet port, individual to and operatively connected with each component, of an equalizer having an independent chamber and piston individual to each motor, each chamber being provided with an inlet and an outlet port, the outlet ports of the equalizer chambers being in direct communication with the inlet ports of the motors and the pistons of said chambers being connected for operation in unison, a source of fluid under pressure connectible with the inlet ports of the equalizer, a return to said source of fluid under pressure connectible with either the outlet ports of the motors or the inlet ports of the equalizers, a relief valve between the source of fluid under pressure and said return, and a normally closed valve group having opposed ports connected with the outlet ports of the equalizer chambers and the inlet ports of the motors each closed by an automatic valve and having a medial port connected with the inlet ports of said equalizer chambers and said source of fluid under pressure, and manually operated means for controlling the flow of fluid from said medial port.

7. An hydraulic system for the synchronous operation of dual aircraft components comprising; the combination with an hydraulic motor, including an inlet and an outlet port, individual to and operatively connected with each component, of an equalizer having an independent chamber and piston for each motor each chamber being provided with an inlet and an outlet port, the outlet ports of the equalizer chambers being in direct communication with the inlet ports of the motors and the said pistons being connected for operation in unison, a source of fluid under pressure connectible with the inlet ports of the equalizer, a return to said source of fluid under pressure, a selector valve adjustable either to establish communication between the source of fluid and the inlet ports of the equalizer and between the outlet ports of the motors and the return or, in the alternative, between the inlet ports of the equalizer and the return and between the source of fluid under pressure and the outlet ports of the motors, a relief valve between the source of fluid under pressure and said return, a valve casing having opposed end ports and an intermediate port, said end ports being connected respectively with one of the outlet ports of the equalizer chambers and with one of the outlet ports of the motors, and said intermediate port being connected to the inlet ports of the equalizer chambers, spring loaded valves to automatically close the opposed end ports, a manually operable means to regulate the operation of the intermediate port, and means whereby the operation of said means for regulating the operation of the intermediate port simultaneously operates the valves of the end ports against their springs.

8. An hydraulic system for the synchronous operation of dual aircraft components comprising; the combination with an hydraulic motor, including an inlet and an outlet port, individual to and operatively connected with each component, of an equalizer having an independent chamber and piston individual to each motor provided with an inlet and an outlet port, the outlet ports of the equalizer chambers being in direct communication with the inlet ports of the motors and said pistons being connected for operation in unison, a source of fluid under pressure connectible with the inlet ports of the equalizer, a return to said source, a relief valve between the source of fluid under pressure and said return, means to establish communication between said source and the inlet ports of the equalizer and between the outlet ports of the motors and the return or, in the alternative, to reverse the communication so established, a valve casing having ports connected with the outlet ports of the equalizer chambers and a constantly open port connected with the inlet ports of said chambers and having a valve to normally close each port connected with an outlet port of the equalizer, and means for manually opening said valves to connect ports closed thereby with the constantly open port aforesaid.

9. The combination with a source of fluid under pressure and a pair of reversible hydraulic motors, of a hydraulic synchronizing system comprising an equalizing cylinder having a transverse partition subdividing it into two independent chambers, a piston working in each of said chambers, a common stem joining said two pistons across said partition, an inlet from said source of fluid to said cylinder on one side of each of said pistons, an outlet in communication with one of said hydraulic motors on the opposite side of each of said pistons, connections between said inlets and outlets, and manually operated valve means in said connections for establishing a momentary communication between the source of fluid under pressure and said motors when it is desired to replenish the outlet sides of said equalizing cylinder or a permanent communication between the source of fluid under pressure and said motors when it is desired to by-pass said equalizing cylinder.

10. The combination with a source of fluid under pressure and a pair of reversible hydraulic motors, of a hydraulic synchronizing system comprising an equalizing cylinder having a transverse partition subdividing it into two independent chambers, a piston working in each of said chambers, a common stem joining said two pistons across said partition, an inlet to said chamber in communication with said source of fluid under pressure on one side of each of said pistons, an outlet in communication with one of said hydraulic motors on the opposite side of each of said pistons, connections between said inlets and outlets, and manually operated valve means in said connections for establishing a momentary communication between the source of fluid under pressure and said motors when it is desired to replenish the outlet sides of said equalizing cylinder or a permanent communication between the source of fluid under pressure and said motors when it is desired to by-pass said equalizing cylinder, said valve means comprising independent pressure relief means for each of said chambers.

11. The combination with a source of fluid under pressure and a pair of reversible hydraulic motors, of a hydraulic synchronizing system comprising an equalizing cylinder having a transverse partition subdividing it into two independent chambers, a piston working in each of said chambers, a common stem joining said two pistons across said partition, an inlet to said chamber in communication with said source of fluid under pressure on one side of each of said pistons, an outlet in communication with one of said hydraulic motors on the opposite side of each of said pistons, connections between said inlets and outlets, and manually operated valve means in said connections for establishing a momentary communication between the source of fluid under pressure and said motors when it is desired to replenish the outlet sides of said equalizing cylinder or a permanent communication between the source of fluid under pressure and said motors when it is desired to by-pass said equalizing cylinder, said valve means comprising spring-loaded independent pressure relief means adapted to operate automatically when the pressure within the corresponding chambers reach a definite limit.

12. An hydraulic system for the synchronous operation of dual aircraft components comprising; the combination with a common source of fluid under pressure and a reversible motor for each of said components including a cylinder having an inlet and an outlet port and a piston in said cylinder connected to the coacting aircraft component, of an equalizer consisting of a cylinder subdivided into two independent chambers, each chamber having an outlet port and an inlet port, a piston in each chamber, a tandem connection between said pistons whereby they operate in their respective chambers in unison, a normally closed fluid connection between the outlet port of each chamber of the equalizer and the inlet port of each motor cylinder, a pressure line connecting the inlet ports of the equalizer to the source of fluid, a return line connecting the outlet ports of said motor cylinders to said source of fluid and valve means allowing the establishment of a momentary or permanent direct communication between said pressure line and said normally closed connections when it is desired respectively to replenish said closed connections or to by-pass said equalizer altogether.

13. An hydraulic system as claimed in claim 12, in which the cylinder of the equalizer is subdivided into two contiguous, independent chambers of unequal length by means of a transversal partition in which is mounted a central packing gland for the common piston stem of the equalizer.

14. An hydraulic system as claimed in claim 12, in which the cylinder of the equalizer is subdivided into two contiguous, independent chambers of unequal length by means of a transversal partition, in which is provided the inlet port for the large chamber and in which is mounted a central packing gland for the common piston stem of the equalizer.

15. An hydraulic system as claimed in claim 12, in which a spring is mounted between one of the pistons and one of the beads of the cylinder of the equalizer in order to assist the return motion of the joined pistons of the equalizer.

16. An hydraulic system as claimed in claim 12, in which the valve means comprise an elongated housing, a port and a spring-loaded automatic pressure relief valve at each end of said housing, each of said ports communicating with one of the outlet ports of the equalizer, a third port in communication with the source of fluid under pressure, spring loaded valves to establish a communication between said ports and manual means to operate said last mentioned valves.

ROLAND CHRISTIAN BERGH.